United States Patent [19]

Motosugi

[11] Patent Number: 6,016,209
[45] Date of Patent: Jan. 18, 2000

[54] IMAGE FORMING APPARATUS

[75] Inventor: Toshihisa Motosugi, Okazaki, Japan

[73] Assignee: Minolta Co., Ltd., Osaka, Japan

[21] Appl. No.: 08/799,877

[22] Filed: Feb. 13, 1997

[30] Foreign Application Priority Data

Feb. 16, 1996 [JP] Japan ..................................... 8-029152

[51] Int. Cl.[7] .............................. H04N 1/46; H04N 1/387
[52] U.S. Cl. .......................... 358/537; 358/538; 358/452; 358/453
[58] Field of Search .................................... 358/537, 520, 358/518, 538, 452, 453; 382/162, 164, 167

[56] References Cited

U.S. PATENT DOCUMENTS 5,666,207  9/1997  Ohmura .................................. 358/452

*Primary Examiner*—Thomas D. Lee
*Attorney, Agent, or Firm*—Burns, Doane, Swecker & Mathis, LLP

[57] ABSTRACT

In an image forming apparatus capable of coloring a plurality of color editing areas, color data C1 through CDN corresponding to a hue circle are stored in memory beforehand, the number N of color data is divided by the number of areas targeted for coloring to derive a quotient to set a standard color, and the colors are selected for every other number of the quotient, and said colors are appended to the respective color editing areas, thereby reducing the user setting sequence and accomplishing well balanced coloring.

23 Claims, 13 Drawing Sheets

| R | G | B | Attribute |
|---|---|---|---|
| 8 bit | 8 bit | 8 bit | 8 bit |

Fig. 10

| (x-1, y+1) 4 | (x, y+1) 3 | (x+1, y+1) 2 |
|---|---|---|
| (x-1, y) 5 | Target pixel (x, y) | (x+1, y) 1 |
| (x-1, y-1) 6 | (x, y-1) 7 | (x+1, y-1) 8 |

Fig. 11

| Color data number | Color data datum | | |
|---|---|---|---|
| | R | G | B |
| $CD_1$ | 100 | 0 | 0 |
| $CD_2$ | 90 | 5 | 10 |
| ⋮ | ⋮ | ⋮ | ⋮ |
| $CD_n$ | 0 | 50 | 50 |
| ⋮ | ⋮ | ⋮ | ⋮ |

IMAGE FORMING APPARATUS

BACKGROUND OF THE INVENTION

1. Field of the Invention

The present invention relates to an image forming apparatus capable of coloring with different colors in a plurality of coloring regions (hereinafter referred to as color editing areas), and specifically relates to an image forming apparatus capable of coloring with excellent color balance from the perspective of hue circles.

2. Description of the Related Art

When coloring within a closed loop region, prior art such as that disclosed in, for example, Japanese Unexamined Patent Application No. 3-189878, has proposed color editing to color within said region without leaking.

OBJECTS AND SUMMARY

In the aforesaid color editing method, however, a user must select colors one by one for each color editing area when there are a plurality of such color editing areas. Accordingly, a disadvantage arises inasmuch as the operation sequence is complex for the user.

An object of the present invention is to shorten the operation sequence of users in an image forming apparatus capable of coloring a plurality of color editing areas.

Another object of the present invention is to provide an image forming apparatus capable of accomplishing coloring having excellent balance from the perspective of hue circles.

These objects are achieved by an image forming apparatus capable of coloring a plurality of color editing areas and comprising a recording member to record a plurality of color data corresponding to hue circles, a setting mechanism to set a standard color, and a selection device to select color data corresponding to each of said color editing areas based on the number of said color editing areas, number of said color data, and said set standard color.

According to the aforesaid image forming apparatus, color data corresponding to each of a plurality of color editing areas are selectable based on the number of said color editing areas, number of said color data recorded in accordance with hue circles, and said set standard color. Thus, it is possible to shorten the operation setting sequence of a user in this image forming apparatus. Furthermore, it is possible to provide an image forming apparatus capable of coloring with excellent color balance because image data corresponding to hue circles are recorded in memory.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 10 shows the pixels surrounding the target pixel;

FIG. 11 illustrates color data stored in control memory 149;

DESCRIPTION OF THE PREFERRED EMBODIMENTS

Figure 1:
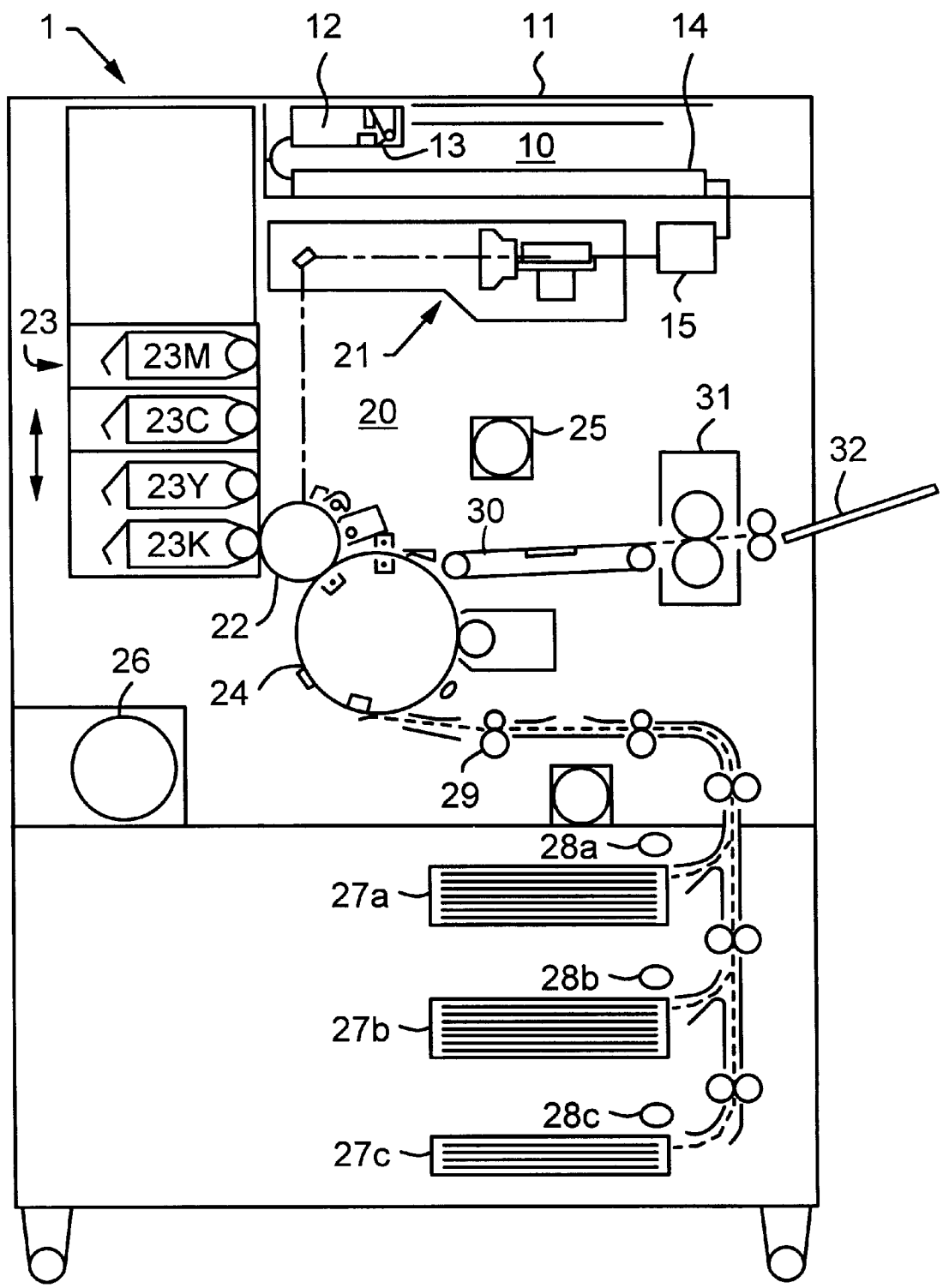
FIG. 1 is a brief section view showing the general construction of a digital color copier.

FIG. 1 is a section view briefly showing the general construction of digital color copier 1 which is one embodiment of the present invention. In the description that follows, like or equivalent parts are designated by like reference numbers.

This copier comprises an image reader unit 10 and printer unit 20.

Image reader unit 10 optically scans the image of a document placed on document platen 11 via scanner 12, the scanned document image is subjected to photoelectric conversion by color line sensor 13, and the converted image is subjected to predetermined processing by image processing unit 14, then output to printhead controller 15.

The image signals input to printhead controller 15 are converted to digital data to drive the laser diode. An operation panel 16 is provided on the front side of document platen 11 to set the various operating modes of the copier (refer to FIG. 2).

Printer unit 20 comprises an image forming unit, developing unit and paper transporting unit.

The image forming unit writes an electrostatic latent image on the surface of a photosensitive drum 22 via a laser beam modulated in accordance with the image signals and emitted from printhead 21 provided with a laser diode 211 and image forming optical system, and after said electrostatic latent image is developed by developing unit 23, the developed image is transferred onto a paper sheet on the surface of transfer drum 24. The photosensitive drum 22 and transfer drum 24 are synchronously driven by a drive motor 25.

The developing unit 23 comprises magenta developing device 23M to develop using magenta toner, cyan developing device 23C to develop using cyan toner, yellow developing device 23Y to develop using yellow toner, and black developing device 23K to develop using black toner. The entire developing unit 23 is moved in vertical directions by a motor 26 to position each developing device at sequential developing positions to develop the electrostatic latent image with each color.

The paper transporting unit comprises cassettes 27a, 27b, 27c to accommodate copy paper internally, take-up rollers 28a, 28b, 28c to feed copy sheets from the various cassettes, a plurality of transport rollers to transport fed copy sheets to the image forming unit, a timing roller 29, a transfer drum 24 to repeatedly transport a copy sheet maintained on the surface of said drum to the transfer region to transfer toner images of each color thereon, a transport belt 30 to transport copy sheets after said toner image transfer are completed, a fixing device 31 to fix the toner image onto the surface of the copy sheet, and discharge tray 32 to eject the copy sheet after fixing is completed.

Since the printer unit forms multi-color images using a previously described electrophotographic process, and since the construction of said process is well known, details of said process are omitted from the present description.

Figure 2:
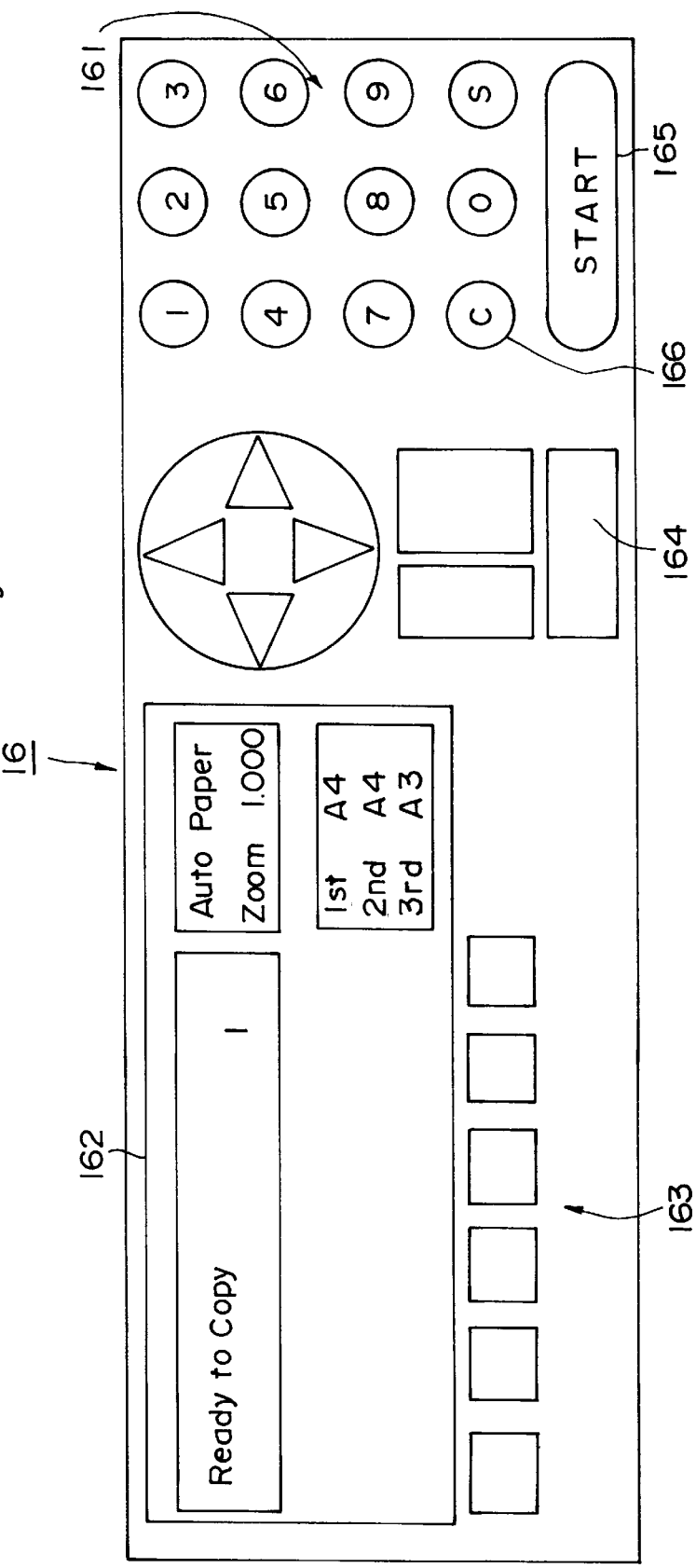
FIG. 2 is an exterior view of the operation panel of the digital color copier of FIG. 1.

FIG. 2 shows an exterior view of operation panel 16. Reference number 161 refers to a copy number key pad for setting the number of copies, reference number 162 refers to a display unit for displaying the various set operating modes and messages to the user, reference number 163 refers to an input key pad for setting the operating mode in accordance with displayed messages, reference number 164 refers to an enter key for confirming the input set state, reference number 165 refers to a print button for specifying the start of a copy operation, and reference number 166 is a reset key.

Figure 3:
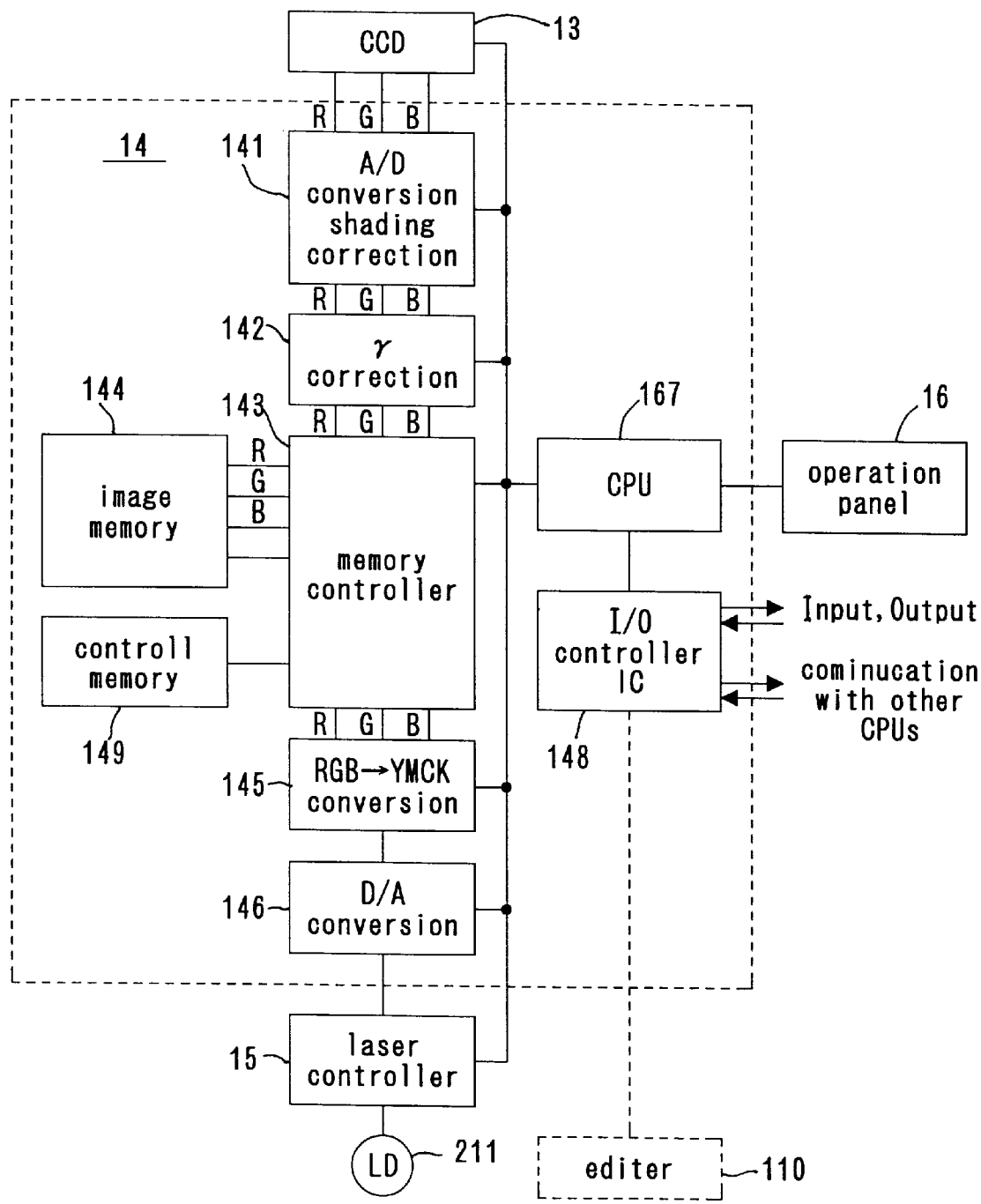
FIG. 3 is a block diagram of the control circuit of the copier of FIG. 1.

FIG. 3 is a block diagram of a control circuit of the copier. Each RGB image signal of a document read by color line sensor 13 is subjected to analog-to-digital (A/D) conversion and shading correction by preprocessing unit 141 of image processing unit 14, and subsequently subjected to halftone correction by gamma correction unit 142, then temporarily stored in image memory 144 via memory controller 143. After further image processing which is described later, the RGB image data are read out of memory via memory controller 143 with an image forming timing for each color by the image forming unit. The RGB image data are converted from RGB to the YMCK color system by color converter 145, and subsequently converted to analog signals by digital-to-analog (D/A) converter 146. The light emission of laser diode 211 is accomplished in accordance with these analog signals by printhead controller (laser controller) 15. The various copy modes set by operation panel 16 are stored in control memory 149, and microcomputer (CPU) 167 reads the control data stored in control memory 149 and executes sequence controls for the previously mentioned line sensor 13, image processing unit 14, and printhead controller 15. Other input/output controls during copy execution, and communication controls with other CPUs not shown in the drawings are accomplished via an input/output (I/O) controller IC 148.

Figure 13:
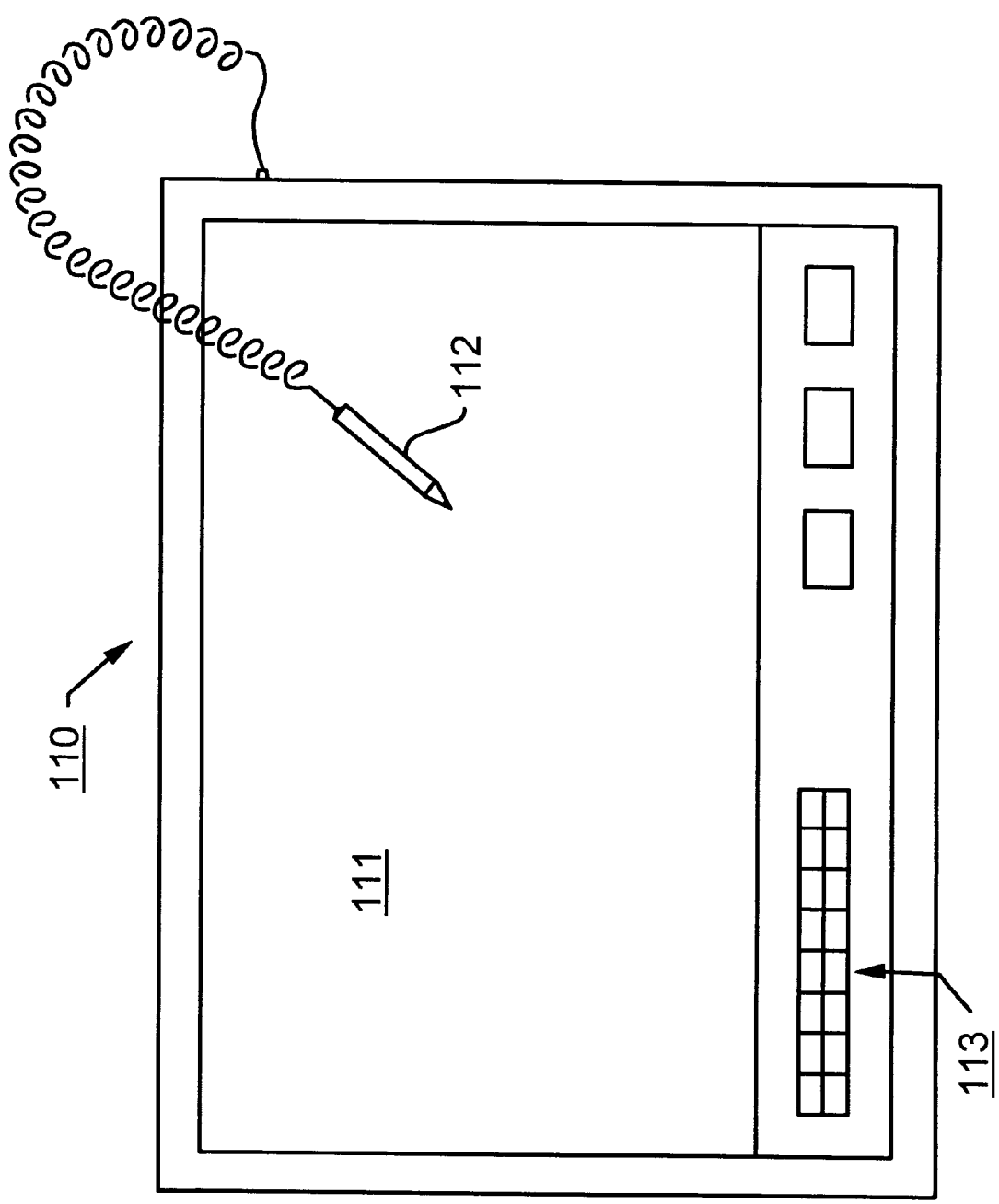
FIG. 13 is an exterior view of editor 110 of FIG. 3.

Standard color and color editing areas can be input from the editor 110 shown in FIG. 13 via the I/O controller IC 148.

Figures 4, 5:
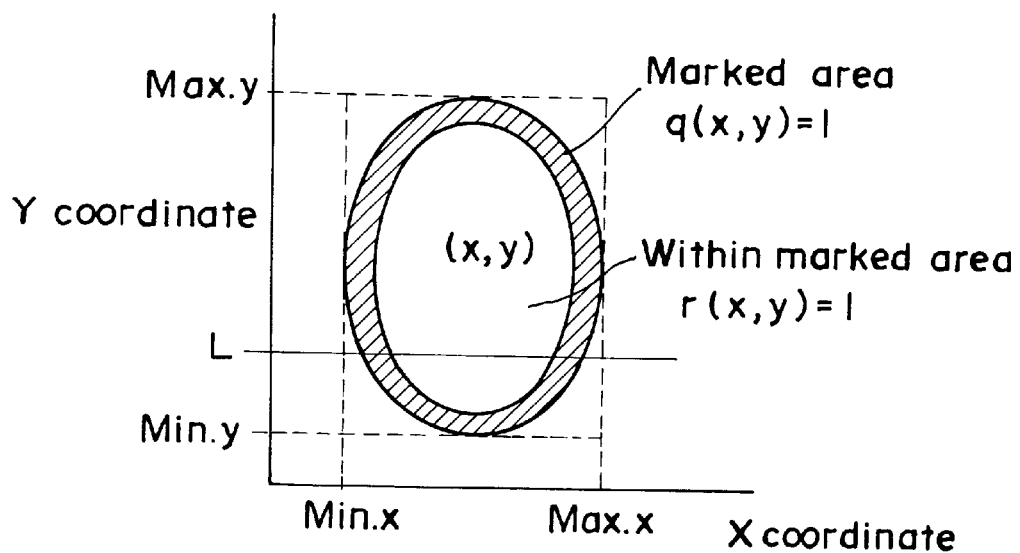
FIG. 4 illustrates the process of detecting an area circumscribed by markers.
FIG. 5 shows the stored state of image signals read by the line sensor.

As shown in FIG. 4, image memory 144 sets two-dimensional addresses for the x-coordinates (the coordinates in the main scan direction in the array direction of line sensor 13) and y-coordinates (the coordinates in the subscan direction perpendicular to the main scan direction) of a document, and stores in memory the image data of each pixel read by line sensor 13 at each address. As shown in FIG. 5, the image data of each pixel stored in image memory 144 comprise 8-bit attribute information and 8-bit area (each 8-bit of RGB data=256 color gradations) expressing the value of each electronic signal of RGB data read by line sensor 13. The attribute information is the area storing editing information described later.

Figure 6:
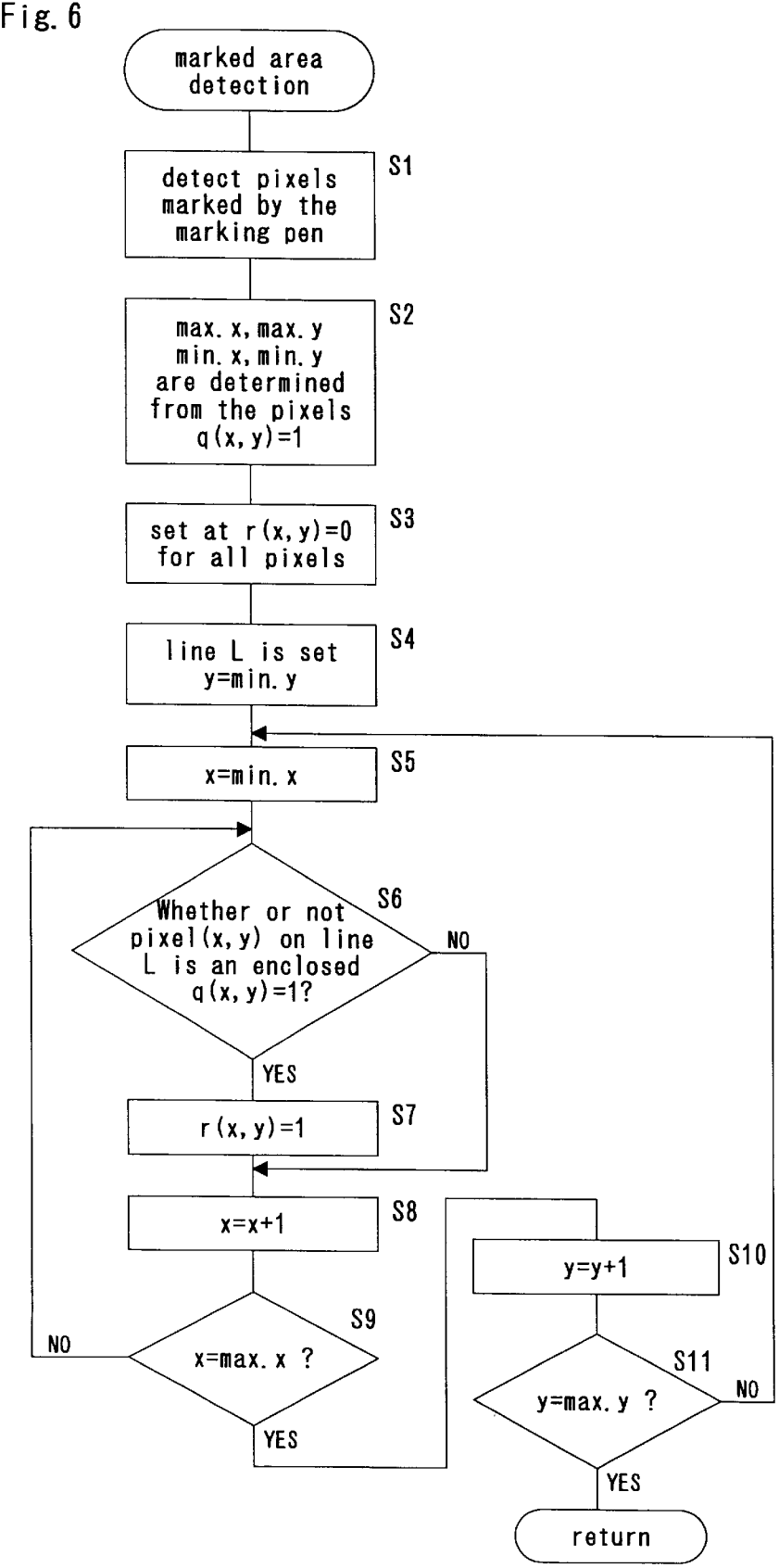
FIG. 6 is a flow chart of the marked area detection process executed by CPU 167.
Figure 7:
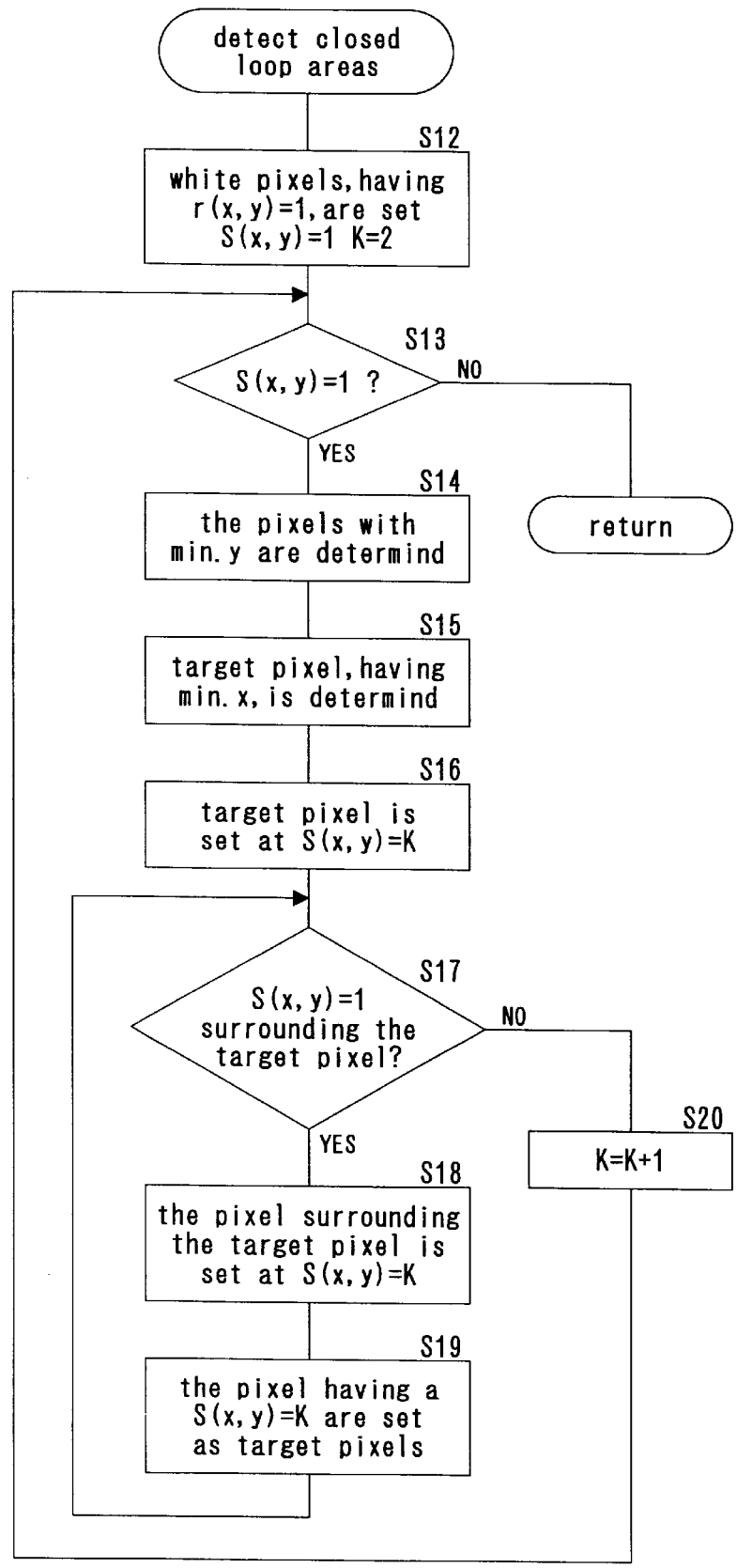
FIG. 7 is a flow chart of the closed loop area detection process executed by CPU 167.

In the digital color copier having the previously described construction, the coloring process executed by CPU 167 is accomplished in the sequence described below:

1) detection of closed loop graphics within a marked area; and
2) coloring within a detected closed loop area.
   (1) Detection of closed loop graphics within a marked area
   FIGS. 6 and 7 are flow charts of programs executed by CPU 167.

A user (operator) confirms the selection of a specified coloring process via the operation of mode setting key 163 and enter key 164 on operation panel 16, circumscribes areas within the document which are to be colored by the coloring process using a marking pen (not illustrated), sets the document on document platen 11, and operates the print button 165. The image data of the document are then stored in image memory 144 as previously described.

Then, CPU 167 detects pixels marked by the marking pen in the document image based on image data stored in image memory 144 (step S1). This detection is accomplished by detecting a specific color (color corresponding to the marking pen) in image memory 144, by a well known method. The first bit of attribute information is set at [1] for the marked pixel (x,y), and set at [0] for other pixels. The value of the first bit of attribute information of pixel (x,y) is expressed as q(x,y).

Pixels within the closed loop area circumscribed by the marker (hereinafter referred to as "marked area") are detected. Specifically, in step S2, the value of the minimum and maximum addresses (hereinafter referred to as "min-x, min-y, max-x, max-y") of each coordinate x, y (addresses in image memory 144) are determined from the pixels satisfying the relation q(x,y)=1.

Figure 8:
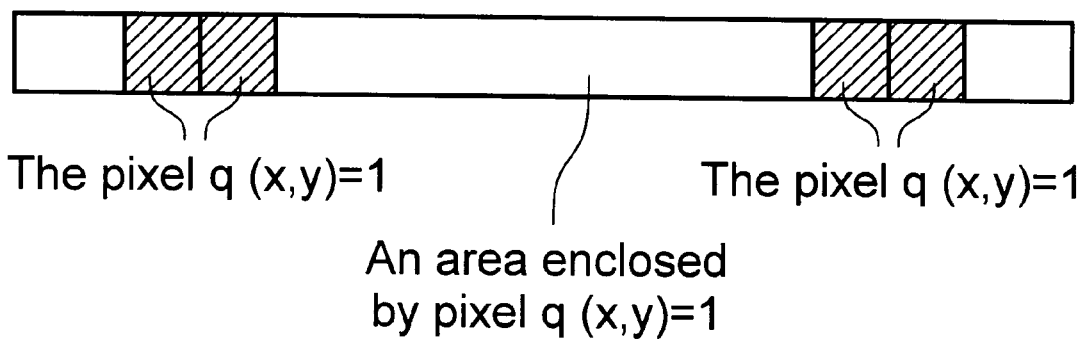
FIG. 8 illustrates the marked area detection process.

Then, in step S3, the second bit of attribute information is set at [0] for all pixels. The value of the second bit of attribute information of pixel (x,y) is expressed as r(x,y). In step S4, a pointer (line L) expressing a line extending in the x-coordinate direction is set at a position expressing a minimum value min-y determined in step S2 in image memory 144, and in step S5, a value x expressing a pixel on line L is set at a minimum value min-x determined in step S2. A determination is made as to whether or not the pixel (x,y) set on the specified line L is an enclosed pixel q(x,y)=1, as shown in FIG. 8 (step S6). In the case of an enclosed pixel, the second bit r(x,y) of attribute information is set at [1].

In step S8, the value of x is incremented by 1, the next pixel on line L is specified, and the processes of steps S6 and S7 are executed as previously described. This process is repeated until, in step S9, the value of x attains the maximum value max-x determined in step S2. Thus, the second bit of attribute information is set at [1] for all pixels at positions within the marked area by the set pixel on line L, as shown in FIG. 4. In step S10, the line L is sequentially incremented until line L attains a maximum value max-x,y (step S11), and the second bit of attribute information is set at [1] for all pixels at positions within the marked area.

When a marked area is detected in this manner, processing is executed to detect closed loop areas of the document image within the marked, and values 2, 3, . . . n are appended to each area. This process is controlled by the sequence shown in FIG. 7. FIGS. 9a through 9d show the conditions of attribute areas of image memory 144 to be processed.

Figure 9A:
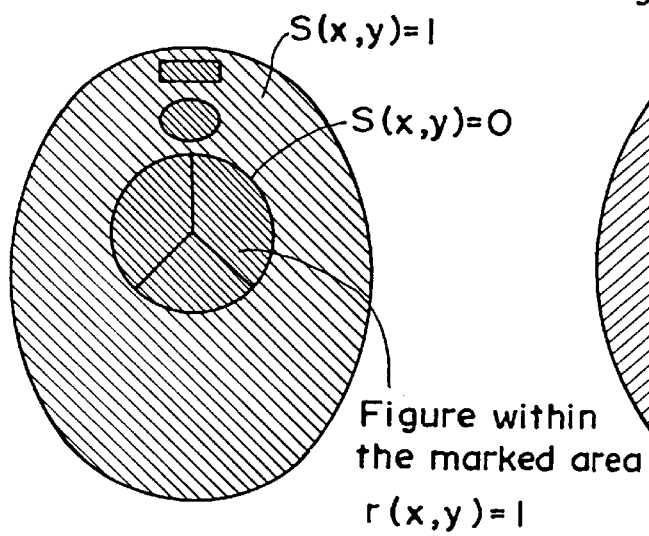
FIG. 9 illustrates the closed loop detection process.
Figure 9B:
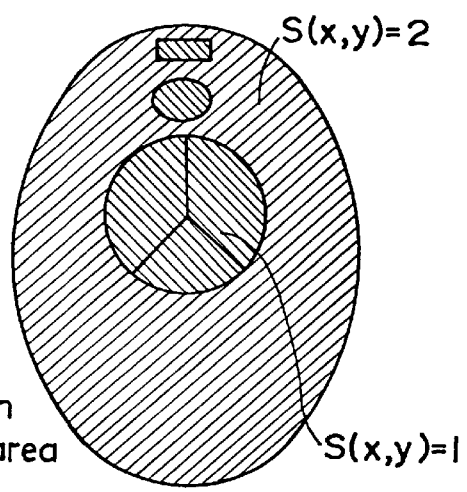

In step S12, pixels within a marked area, i.e., pixels having an attribute second bit of r(x,y)=1, have a value of [1] set for the third through eighth bits of attribute information expressing a white pixel, and the bits of other pixels are set at [0]. The values expressing the third through eighth bits of attribute information of pixel (x,y) are expressed as s(x,y) in the following discussion. White pixels are pixels which are not written with the image of the document, and are pixels above a specific value (above 230/256) of all red, green, and blue data values in image memory 144, and pertain to images having a density below a predetermined value (whitish). In step S12, a variable K is set at an initial value of [2]. The condition of image memory 144 at this time is shown in FIG. 9a. The area delineated by diagonal lines in the drawing is the marked area set at r(x,y)=1. The graphic (line image) within the marked area expresses the image of the document, and the pixels on the line image are set at s(x,y)=0, and the pixels outside the line image are set at s(x,y)=1.

Figure 9C:
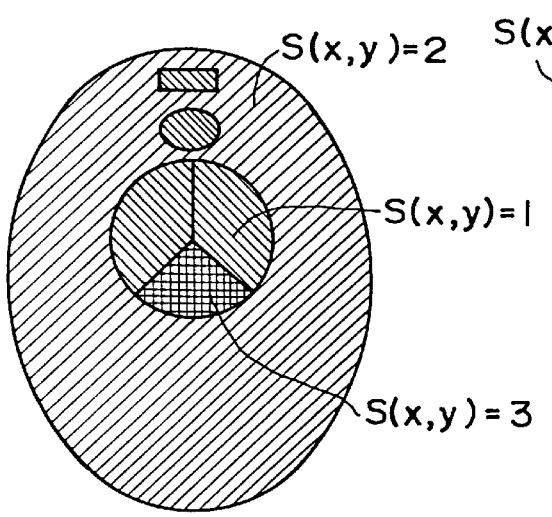
Figure 9D:
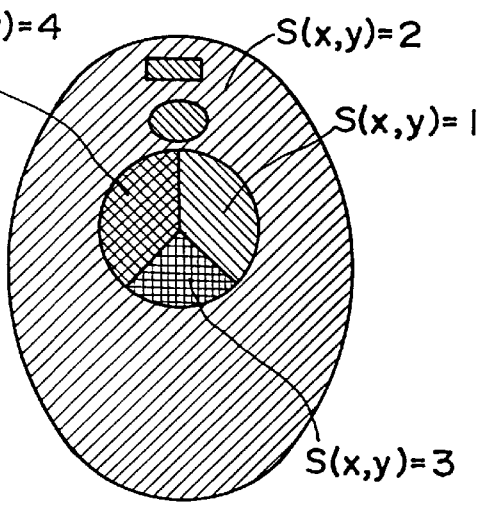

In step S13, pixels having the value s(x,y)=1 are detected. If such pixels are detected, when this process is completed the process advances to steps subsequent to step S13. In step S14, the pixels with minimum y are determined among pixels having the value s(x,y)=1. When a plurality of pixels exist, the pixel having a minimum x value is specified as the target pixel among said pixels (step S15). The target pixel is set at s(x,y)=K (step S16). In step S17, pixels having a value of s(x,y)=1 surrounding the target pixel are detected. If such pixels exist, a value of s(x,y)=K (initial value=2) is appended to pixels having a value s(x,y)=1 surrounding the target pixel in step S18. In step S18, the pixels having a value of s(x,y)=K are set as the target pixels, and the processes of steps S17 through S19 are repeated. The pixels surrounding the target pixels comprise eight pixels as shown in FIG. 10, and each is targeted in the numerical order shown in FIG. 10. If none of the pixels surrounding the target pixel has a value s(x,y)=1, the value of counter K is advanced by 1 in step S20, and the processes of steps S13 through S20 are repeated. The condition of image memory 144 changes as shown in FIGS. 9c and 9d in accordance with the increase in the value of the constant K.

The aforesaid process ends if a pixel having a value of s(x,y)=1 is not found among the white pixels within the marked area (step S13: NO). At this stage, numbers are appended to each region having pixels of a closed loop area of a document image within a marked area (refer to FIG. 9e).

Figure 9E:
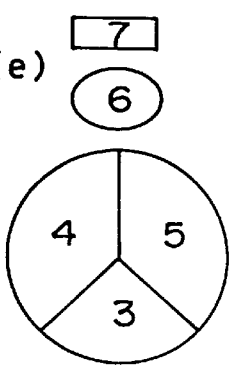

In FIG. 9e, the five areas with appended numbers 3 through 7 are areas which are to be colored.

Figure 12:
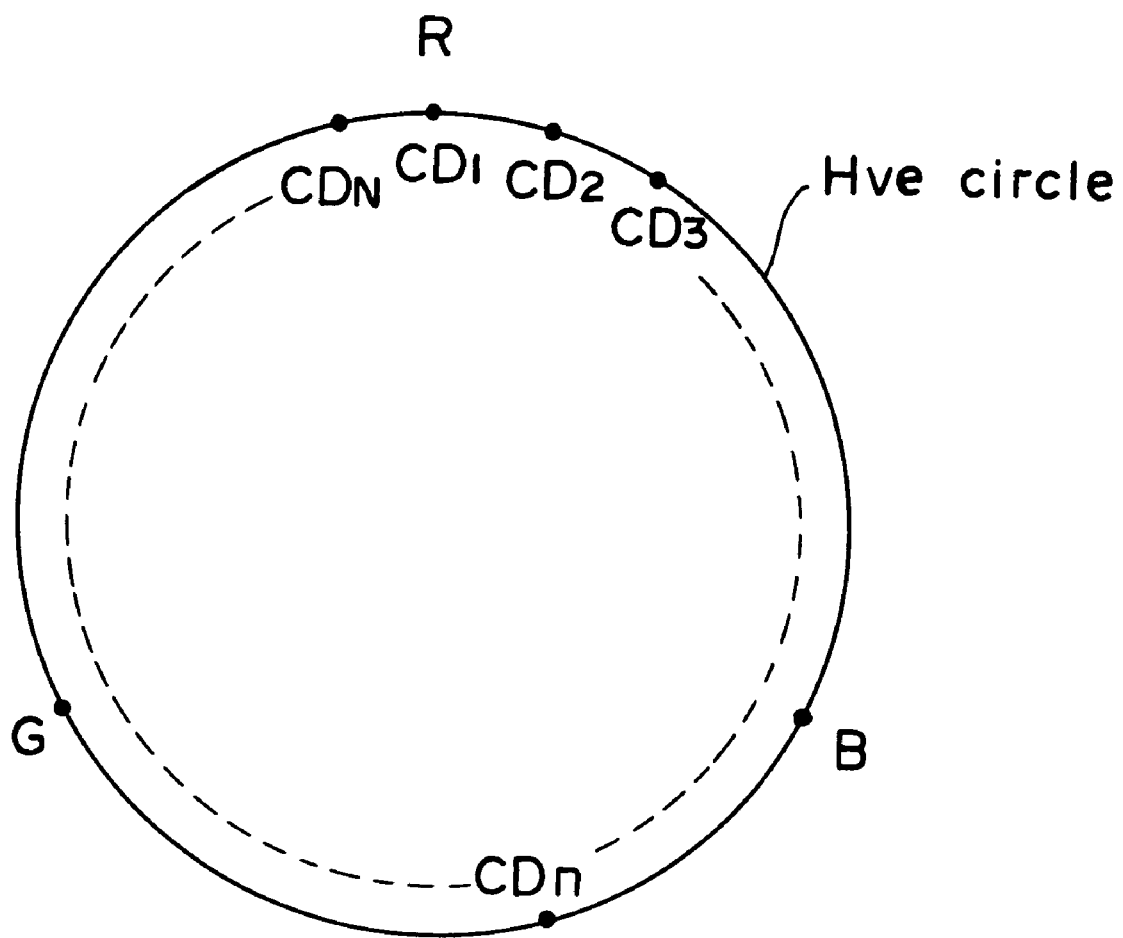
FIG. 12 illustrates the relationships of the color circles of color data shown in FIG. 11.

Color data CD1 through CDN are stored in control memory 149 in table format. The various color data comprise values for red (R), green (G), and blue (B), as shown in FIG. 11. The color data are arranged in sequence on a hue circle as shown in FIG. 12. That is, color data CD1 and color data CDN are adjacent on the hue circle.

When, for example, 60 colors are used as the number of color data (N=60), the color data CD1 becomes the red color data. Accordingly, the R datum of CD1 is 100, the G datum is 0, and the B datum is 0.

(2) Coloring within a detected closed loop area

Figure 14:
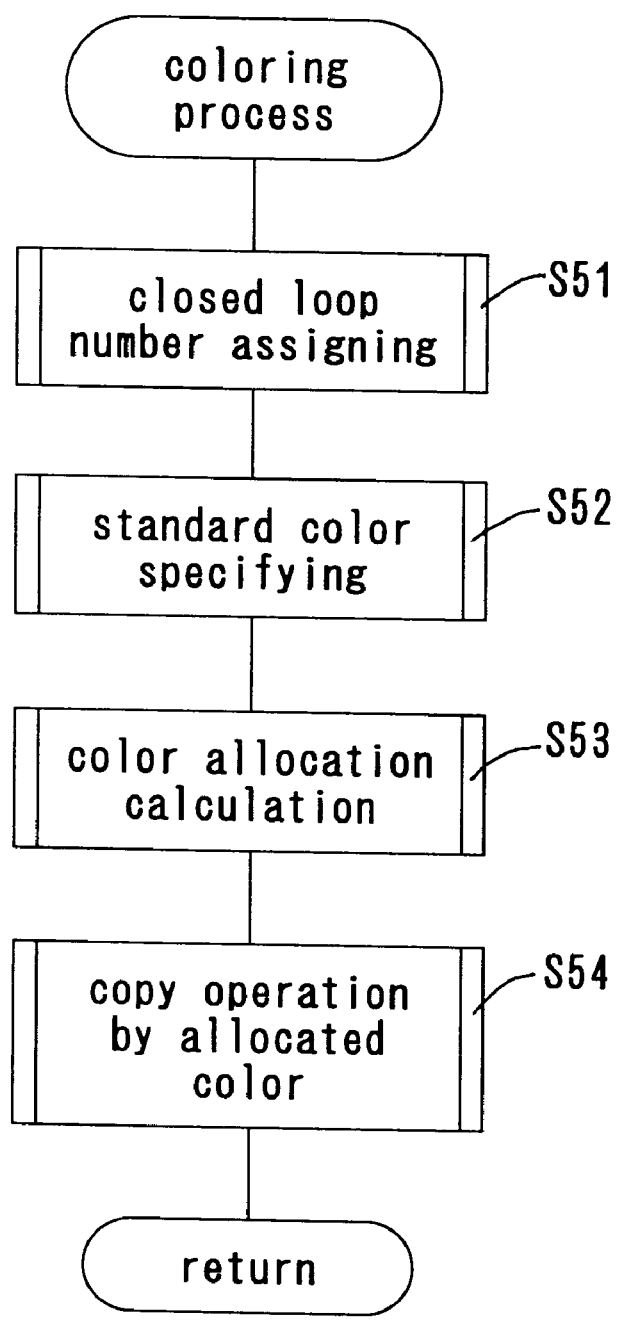
FIG. 14 is a flow chart of the coloring process executed by the CPU.

The coloring process shown in the flow chart of FIG. 14 is executed for closed loop graphics within a detected marked area as described above.

Referring to the drawing, in step S51 a number is appended to each detected closed loop graphic. In step S52, a standard color is specified by user operation. In step S53, the colors allocated to each closed loop are calculated. In step S54, copy operations are executed in the allocated colors.

The contents of the respective steps are described below.

(2-1) Closed loop number assigning process

A number is assigned to each area targeted for coloring. Specifically, numbers E1 through E5 are assigned to each area targeted for coloring and given numbers 3 through 7 in FIG. 9e.

(2—2) Standard color specifying process (S52)

In coloring a closed loop, the editor (area specifying tablet) 110 is used by a user to select a standard color. A standard color is selected by specifying a selected region on color palette 113 using editor pen 112.

A standard color need not be selected by a user, but rather may be set in the device beforehand, or input by a user, e.g., "number CD1 color data."

(2-3) Color allocation calculation process (S53)

Figure 15:
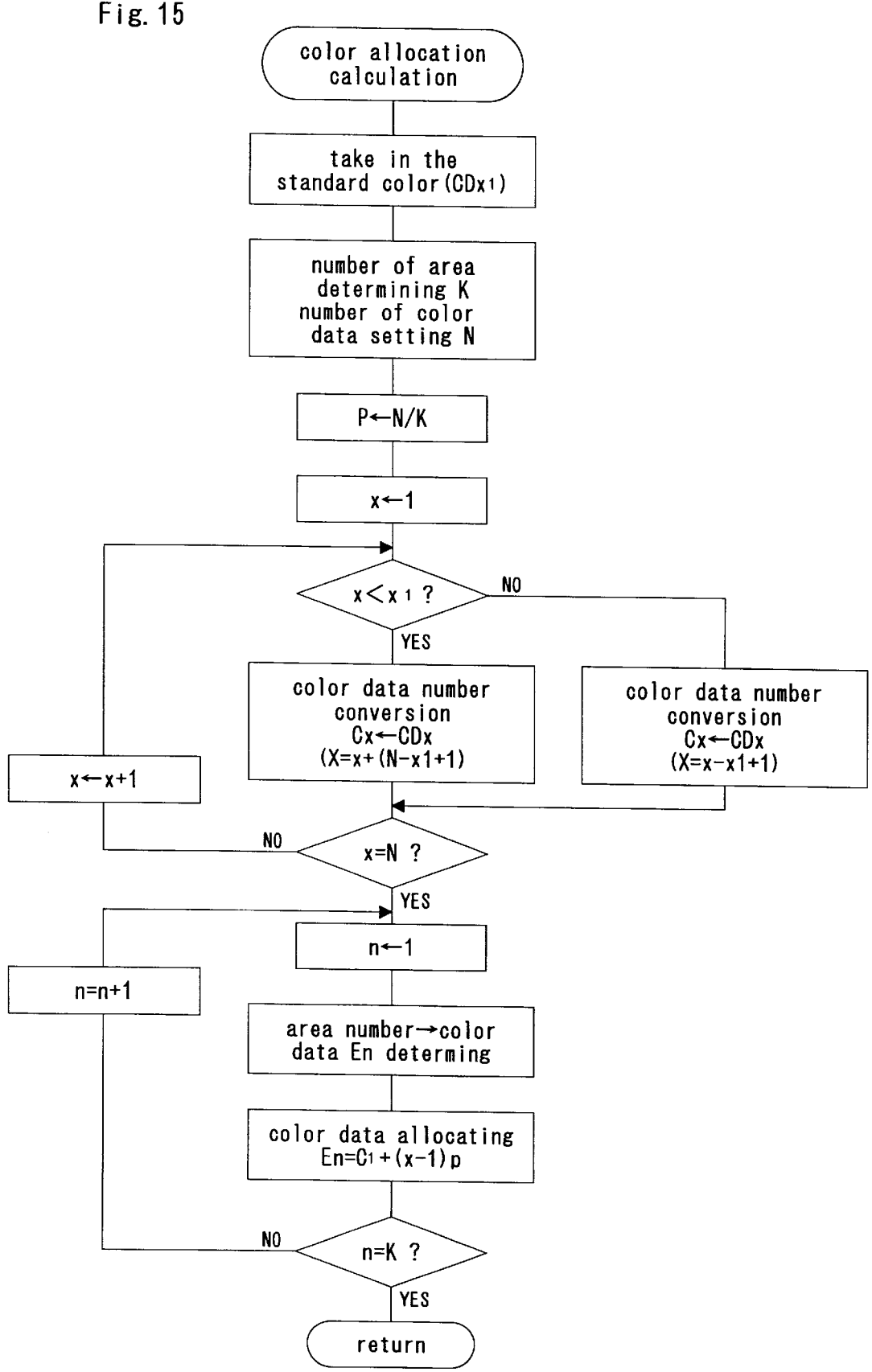
FIG. 15 is a flow chart showing the calculation of equivalent color executed in step S53 of FIG. 14.

The color allocation calculation process is executed, as shown in FIG. 15. When the color data number of the selected standard color is designated CDt1, the total number of stored color data is designated N, the number of areas targeted for coloring is designated K, and the quotient of N divided by K is designated p, the color data number is converted based on Equation (1) below to derive color data C1, C1+p, C1+2p, . . . C1+(K−1)p.

When CT=CDt (T=t+(N−t1+1 when t<t1) and t≧t1, the following equation obtains:

$$T = t - t1 + 1 \qquad (1)$$

Where t1 is a number appended to a selected standard color.

The color data numbers appended to each coloring target area E1 through EK are derived by Equation (2) below.

$$E1 = C1$$

$$E2 = C1 + 2p$$

$$EK = C1 + (K-1)p \qquad (2)$$

Specifically, there are five detected closed loop areas as shown in FIG. 9e, and when the color data comprise 60 colors, the color data numbers appended to each area are determined as described below.

The numbers E1 through E5 are appended to areas numbered 3 through 7 as previously described. Then, the number of color data (N=60) is divided by the number of closed loop areas (K=5), to determine a quotient (P=12).

When the color of color data CD10 is selected as the standard color from the color palette 113 by a user using the editor pen 112, the color data numbers C1, C1+12, C1+2*12, C1+3*12, C1+4*12 are selected (where the asterisk mark (*) indicates a multiplication operation.

Using Equation (1), the respective color data are selected:
C1=CD10
C1+12=C13=CD22
C1+2*12=C25=CD34
C1+3*12=C37=CD46
C1+4*12=C49=CD58

Area E1 is allocated C1 as color data, area E2 is allocated C13 as color data, area E3 is allocated C25 as color data, area E4 is allocated C37 as color data, and area E5 is allocated C49 as color data.

Although the number of color data is exactly divisible by the number of closed loop areas in the previously described example, it is possible to select a color from a low number of color data numbers by calculating a quotient even when the number is not exactly divisible by ignoring the remainder. Balance on the hue circle can be maintained even using this color selection method.

Control of the aforesaid calculations is accomplished in control memory 149.

(2-4) Copy operation process by allocated color (S54)

After coloring is accomplished, a copy operation is executed in accordance with the RGB data of image memory 144 which is identical to a normal copy process. Thus, a color edited copy image can be produced.

Coloring is not limited to the closed loop area as previously described, inasmuch as an identical color selection method may be used when the editor 110 shown in FIG. 13 is used to assign color editing areas. That is, is possible to accomplish coloring by an identical method by attaching area numbers E1, E2, . . . to each specified area.

When accomplishing color editing in the previously described embodiment, coloring may be accomplished by combining well balanced colors to a plurality of color editing areas from the perspective of hue circles by selecting a single color. Furthermore, the user setting sequence is reduced as much as possible, and color editing of attractive appearance can be accomplished.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image forming apparatus capable of coloring a plurality of editing areas, said color image forming apparatus comprising:

a recording member for recording a plurality of color data corresponding to a hue circle;

determining member for determining a standard color; and a selection device for selecting color data corresponding to each of said color editing areas based on the number of said color editing areas, a number of said plurality of color data corresponding to the hue circle, and said set standard color.

2. An image forming apparatus as claimed in claim 1, further comprising:

a detector for detecting closed loop regions of a document image, such that the color editing area is specified as a region detected by said detector.

3. An image forming apparatus as claimed in claim 2, further comprising:

an image scanner which reads a document recorded on a paper sheet by converting said document to electronic data by a photoelectric converter, and wherein said detector detects closed loop regions based on said data read by the scanner.

4. An image forming apparatus as claimed in claim 3, further comprising:

a discrimination means for discriminating an editing region containing a plurality of color editing areas.

5. An image forming apparatus as claimed in claim 1, wherein said determining member determines a standard color which is choosed of stored a plurality color data.

6. An image forming apparatus as claimed in claim 1, wherein said determining member determines a predetermind color on a standered color data.

7. An image forming apparatus as claimed in claim 1, wherein said selection device selects the color of each color editing area using the relationships of the aforesaid hue circles so as to avoid biasing of the color data used for coloring.

8. An image forming apparatus as claimed in claim 1, wherein said plurality of color data corresponding to the hue circle are reproducible by the recording member.

9. A color image forming apparatus having editing functions for coloring a plurality- of editing areas, said color image forming apparatus comprising:

an area discrimination device for discriminating the editing areas to be colored and counting the number of editing areas;

a recording member for storing a plurality of color data corresponding to a hue circle;

a setting device for setting a standard color;

a selection device for selecting color data for each of said plurality of editing areas based on the number of said editing areas and said set standard color; and a controller for controlling the coloring of said editing areas based on color data selected by said selection device.

10. An image forming apparatus as claimed in claim 9, wherein said selection device allocates the color data of the set standard color to one editing area among a plurality of said editing areas.

11. An image forming apparatus as claimed in claim 9, wherein said selection device accomplishes selection of color data by allocating the relationships of the hue circle equally by dividing the number of stored color data by the number of editing areas.

12. An image forming apparatus as claimed in claim 9, wherein the selection device also bases the color selection on a number of said plurality of color data corresponding to the hue circle that are reproducible by the recording member.

13. A color image forming apparatus having editing functions for coloring a plurality of editing areas, said color image forming apparatus comprising:

an area discrimination device for discriminating the editing areas to be colored;

a recording member for storing a plurality of color data corresponding to a hue circle;

a selection device for selecting color data for each of said plurality of editing areas based on the number of said editing areas discriminated by said area discrimination device and the number of the color data corresponding to the hue circle stored in said recording member; and a controller for controlling the coloring of said editing areas based on color data selected by said selection device.

14. An image forming apparatus as claimed in claim 13, wherein said selection device accomplishs selection of color data by allocating the relationships of hue circles equally.

15. An image editing method for coloring a plurality of color editing areas comprising:

a step of discriminating a plurality of color editing areas, and counting the number of said areas;

a step of setting a color as a standard color; and a step of determining color data corresponding to each color editing area based on said set standard color and the number of said color editing areas.

16. An image editing method as claimed in claim 15, plurality of color data are selected so as to achieve a uniform difference in the relationships of the hue circle of each color data, when determining color data responding to each of said color editing area.

17. An image editing method as claimed in claim 16, wherein said color data is stored in memory in conjunction with the hue circle, such that color data is determined in conjunction with each said color editing area by determining the difference of the hue circle between adjacent color data among the selected color data from the number of stored color data and the number of said color editing areas.

18. An image editing method as claimed in claim 15, further comprising:

a step of detecting closed loops in an input document so as to discriminate said color editing areas from the detected closed loops.

19. An image editing method as claimed in claim 15, wherein the color data determination step is also based on a number of reproducible colors corresponding to a hue circle.

20. An image forming apparatus capable of coloring a plurality of editing areas, said color image forming apparatus comprising:

- a recording member for recording a plurality of color data;
- a determining member for determining a standard color; and
- a selection device for automatically selecting color data corresponding to each of said color editing areas based on the number of said color editing areas and said determined standard color.

21. An image forming apparatus as claimed in claim 20, wherein the selection of color data is also based on a number of the plurality of color data.

22. An image forming apparatus capable of coloring a plurality of editing areas, said color image forming apparatus comprising:

- a recording member for recording a plurality of color data; and
- a selection device for automatically selecting color data corresponding to each of said editing areas.

23. An image forming apparatus as claimed in claim 22, further comprising:

- a detector for detecting closed loop regions of a document image, such that the color editing area is specified as a region detected by said detector.

* * * * *